United States Patent [19]

Sato

[11] Patent Number: 5,235,253
[45] Date of Patent: Aug. 10, 1993

[54] THIN-FILM ELECTROLUMINESCENT DEVICE DRIVE CIRCUIT

[75] Inventor: Yoshihide Sato, Kanagawa, Japan

[73] Assignee: Fuji Xerox Co., Ltd., Tokyo, Japan

[21] Appl. No.: 990,942

[22] Filed: Dec. 14, 1992

Related U.S. Application Data

[63] Continuation of Ser. No. 771,229, Oct. 4, 1991, abandoned.

[30] Foreign Application Priority Data

Nov. 27, 1990 [JP] Japan .................................. 2-320614

[51] Int. Cl.$^5$ .......................... G09G 3/10; H05B 37/00
[52] U.S. Cl. ............................ 315/169.3; 315/241 R; 315/246; 340/781
[58] Field of Search ................ 315/241 R, 246, 167.3; 340/781

[56] References Cited

U.S. PATENT DOCUMENTS

| | | | |
|---|---|---|---|
| 4,210,848 | 7/1980 | Suzuki et al. | 315/169.3 |
| 4,527,096 | 7/1985 | Kindlmann | 315/169.3 |
| 4,845,489 | 7/1989 | Hormel | 315/169.3 |
| 4,899,086 | 2/1990 | Hirata et al. | 315/169.3 |
| 4,949,019 | 8/1990 | Isaka et al. | 315/169.3 |

OTHER PUBLICATIONS

Leksell et al. "The construction and characterization of a 40 0dpi Thin-Film Electroluminescence edge emitter," Proceedings of the SID, vol. 29/2, 1988 pp. 147-150.
"A 6×6-in. 20 Lpi Electroluminescent Display Panel," by T. P. Brody, et al., for IEEE Trans. Electron Devices, vol. ED-22, pp. 739-749, Sep. 1975.
"An Approach to an MOS-EL Integrated Display Device," Ed82-20, pp. 49-54, 1982.
"A New Al-Ta-O/CdSe TFT Matrix Circuit for EL Display Panels," K. Nomura, et al., pp. 574-577.
"Active Matrix CdSe Addressed Electroluminescent Displays," J. Vanfleteren, et al., for IEEE 1988 International Display Research Conference, pp. 74-79.

Primary Examiner—Robert J. Pascal
Assistant Examiner—Michael B. Shingleton
Attorney, Agent, or Firm—Finnegan, Henderson, Farabow, Garrett & Dunner

[57] ABSTRACT

A thin film electroluminescent EL device drive circuit which is capable of applying an AC pulse signal to EL elements contained in the EL device to thereby perform high luminance drive of the EL devices and realize AC pulse drive. With such a drive circuit, it is possible to reduce supply current capacity and power consumption.

5 Claims, 5 Drawing Sheets

THIN-FILM ELECTROLUMINESCENT DEVICE DRIVE CIRCUIT

This application is a continuation of application Ser. No. 07/771,229, filed Oct. 4, 1991, now abandoned.

BACKGROUND OF THE INVENTION

The present invention relates to a thin film electroluminescent (EL) device drive circuit which drives a thin film EL device in an EL display apparatus or an EL printer head by means of controlling the switching operation of thin film transistors (TFTs) which constitute the thin film EL drive circuit. More particularly, the invention relates to a thin film EL device drive circuit and a method of driving the same, which allow a high voltage pulse drive to cause the thin film EL device to emit high luminance light.

Figure 1:
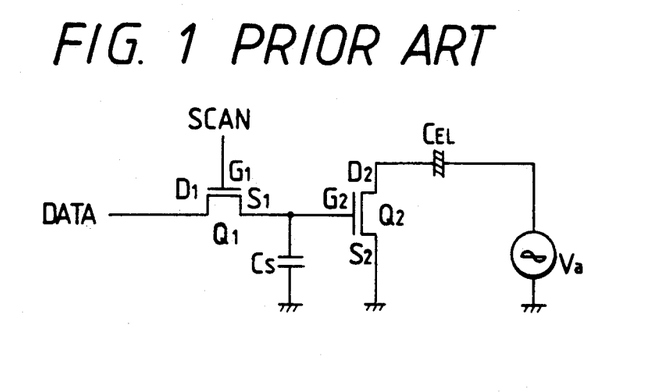
FIG. 1 is a circuit diagram showing an example of a conventional thin film EL device drive circuit.
Figure 2:
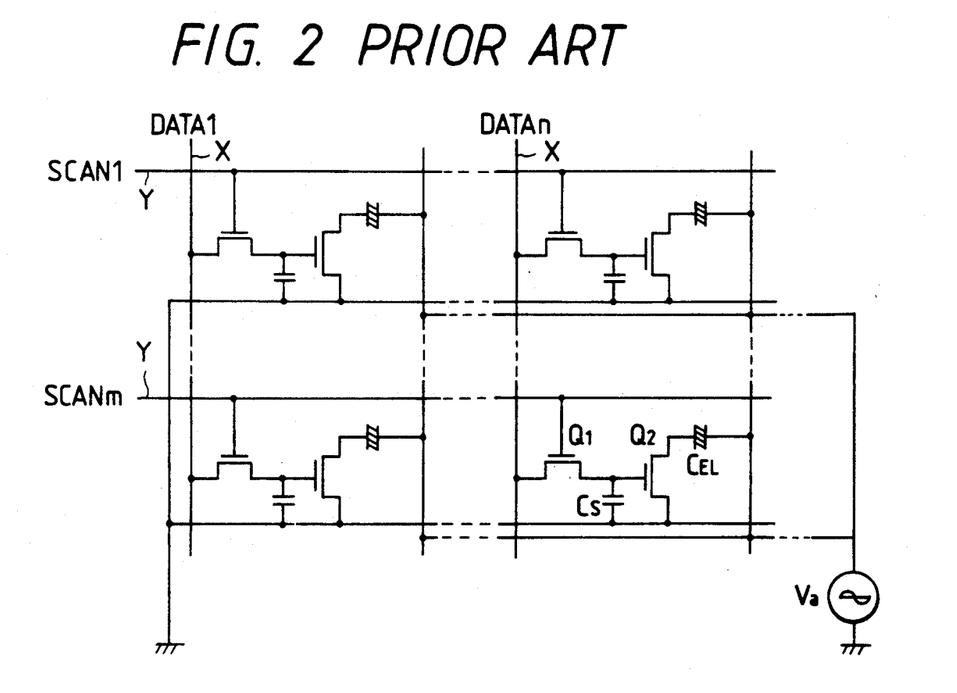
FIG. 2 is a schematic diagram showing an example of a display device.
Figure 3:
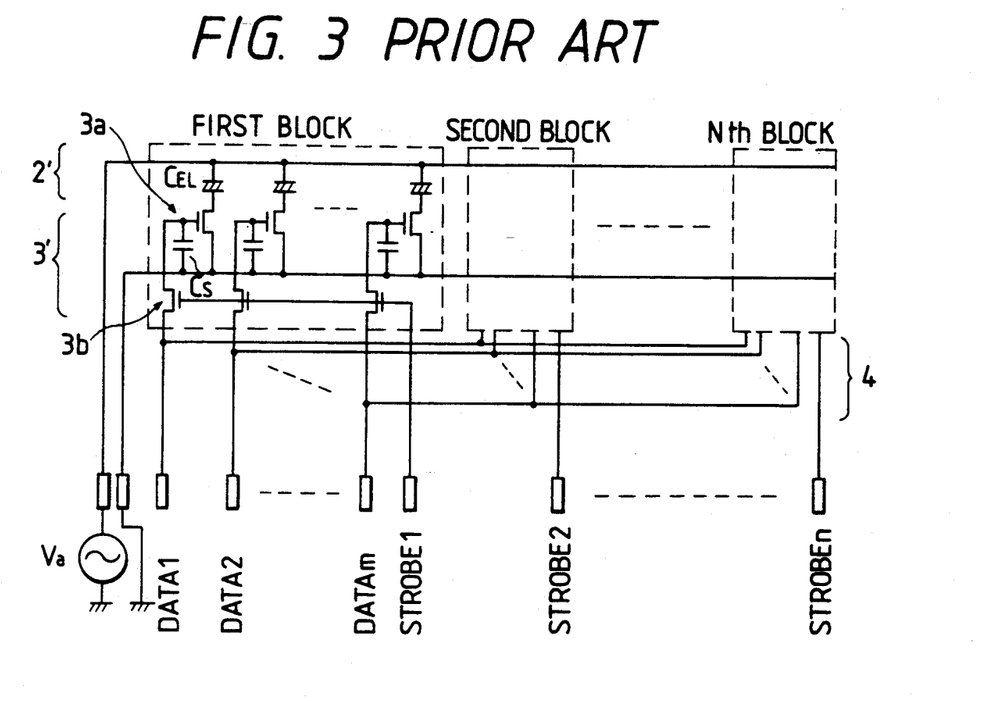
FIG. 3 is also a schematic diagram showing an example of a printer head in which a plurality of EL elements are arranged in array.

FIG. 1 is a circuit diagram showing an example of a conventional thin film EL device drive circuit in which thin film transistors are subjected to a switching operation. The circuit of FIG. 1 operates to drive a thin film electroluminescent element corresponding to one picture element. FIG. 2 is a schematic diagram showing an example of a electroluminescent display device (hereinafter referred to as an EL display device) in which a plurality of EL elements are arranged in a matrix form. FIG. 3 is a schematic diagram showing an example of a printer head in which a plurality of EL elements are arranged in an array, and one electrode of each EL element is connected commonly to a high voltage signal source Va for driving the EL elements.

The circuit of FIG. 1 will be described in more detail.

As shown in FIG. 1, the circuit includes a thin film transistor serving as a first switching element Q1, a storage capacitor Cs, a thin film transistor serving as a second switching element Q2 and an electroluminescent (EL) element $C_{EL}$. In FIG. 1, one terminal of the storage capacitor Cs is connected to a source terminal S1 of the first switching element Q1 whereas the other terminal of the storage capacitor Cs is connected to the ground. A gate terminal G2 of the second switching element Q2 is connected to both one terminal of the capacitor Cs and the source terminal S1 of the first switching element Q1. A source terminal S2 of the second switching element Q2 is connected to the ground whereas a drain terminal D2 thereof is connected to one terminal of the EL element $C_{EL}$, the other terminal of which is connected to a power source Va for driving the EL element $C_{EL}$.

The first switching element Q1 turns on in response to a switching signal SCAN which is applied to the gate terminal G1 thereof so that the storage capacitor Cs is charged in accordance with an electroluminescent signal DATA. The first switching element Q1 is turned-off to thereby discharge the charge of the capacitor Cs. On the other hand, the second switching device Q2 is turned on when a discharge voltage of the storage capacitor Cs is applied to the gate terminal G2, to thereby causes the EL element $C_{EL}$ to emit a light with actuation by the power supply Va.

The EL display device will be described in detail with reference to FIG. 2 where m×n thin film EL device drive circuits are arranged in the matrix form. The gate terminal of the first switching element Q1 of each drive circuit arrayed in a horizontal direction is connected to a switching signal line Y to receive a switching signal SCAN. The drain terminal of the first switching element Q1 of each drive circuit arrayed in the vertical direction is connected to an information signal line X to receive an electroluminescent signal (data signal) DATA. The power supply Va is coupled to one end of the EL element $C_{EL}$ and one end of the capacitor Cs is connected to the ground level. This display device was proposed—in 20-lpi Electroluminescent Display Panel by T.P.Brody, F.C. Luo, et al. in "IEEE Trans. Electron Devices. Vol. ED-22, No. 9, Sept. 1975, Pages 739–749".

The construction of the EL printer head in which the EL device drive circuits are arranged in the form of array will be described with reference to an equivalent circuit of the EL printer head shown in FIG. 3 and a schematic plan view of the EL printer head shown in FIG. 4.

Figure 4:
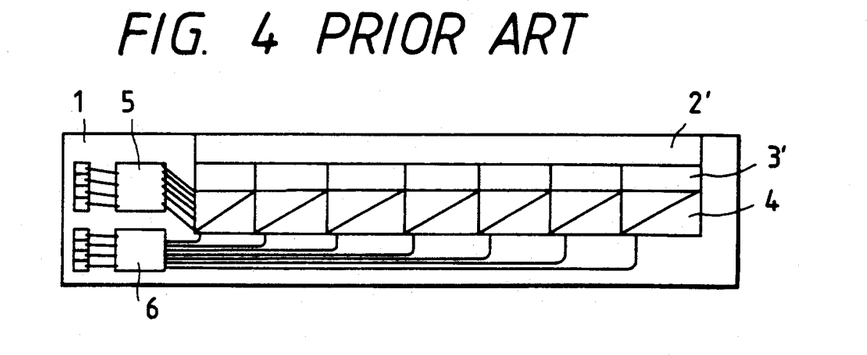
FIG. 4 is a schematic plan view of the printer head shown in FIG. 3.

As shown in FIGS. 3 and 4, provided on an insulate substrate 1 made of glass and the like are an EL element array 2' including plurality of EL elements 2, a switching devices 3 which each include a thin film transistor (TFT) 3a provided corresponding to the EL element 2 and a TFT 3b for controlling the gate of the TFT 3a, a switching device array 3' including the switching elements 3 the number of which corresponds to the number of the EL elements 2 in the EL device array 2', a matrix circuit 4 which has a matrix type wiring structure for connecting the wiring from the switching device array 3' to driver ICs, a data driver IC 5 which supplies the EL control data signal DATA to the drain electrode of TFT 3b of each switching element 3 through the matrix circuit 4, and a strobe driver IC6 which supplies a block control signal STROBE to the gate electrode of TFT 3b of said switching device 3.

The operation of the EL printer head will be described with reference to FIG. 3.

Connected to each of the TFTs 3a constituting the switching element array 3' is the TFT 3b so that a plurality of EL elements $C_{EL}$ form blocks each of which is driven by the data driver IC5 and the strobe driver IC6.

More specifically, the TFTs 3b which are connected to the gate electrodes of the TFTs 3a commonly shares a gate line which connects to the gate electrodes of TFTs 3b so that the TFTs 3b are above to be simultaneously made conductive. The strobe driver IC6 is connected to the gate line to apply a block control pulse signal STROBE to the TFTs 3b. The drain electrode of each TFT 3b is connected to a data line to which the data driver IC5 is connected so that an EL control data signal DATA from said data driver IC5 is supplied to the drain electrodes of TFTs 3b.

With the circuit shown in FIG. 3, when the pulse signal STROBE is applied to the gate electrodes of the TFTs 3b in one of the blocks, all of the TFTs 3b are rendered conductive to thereby allow the connection of the gate electrodes of the TFTs 3a and the data line to charge the storage capacitor Cs according to the pulse signal from the data driver IC5 through the data line. Then, as a result of the TFTs 3a being turned on due to the charge of the capacitor Cs, the EL elements $C_{EL}$ to which the power supply voltage Va is applied emit a light. This was also disclosed in "The Construction and Characterization of a 400-dpi Thin-film Electroluminescence Edge Emitter" D. Leksell et al, Proceedings of the SID. Vol. 29/2, 1988. p147–p150.

In the above-mentioned conventional thin film EL device drive circuit, a sine wave drive circuit is employed as a high voltage signal source Va. However, in view of the luminance characteristics with the EL drive waveform, it is preferable to employ a pulse signal drive circuit in order to carry out high luminance electroluminescence, which is capable of instantaneously supplying a voltage. But, with such a pulse signal drive circuit, a large drive current capacity is required to obtain a sufficient rise characteristic of a high voltage signal for driving all EL devices load in a short period of time, resulting in preventing miniaturization of the signal source and reduction of power consumption.

SUMMARY OF THE INVENTION

In view of the above, an object of the present invention is to provide an apparatus for driving a thin film EL device, which is capable of accomplishing high luminance EL drive with a high voltage pulse signal and reducing a current supplied from a DC power supply to the thin film EL device drive circuit, to thereby realize a compact drive circuit system low in power consumption.

The above, and other objects of the present invention are met by the provision of the drive circuit comprising: a DC power source charging a storage capacitor, an electroluminescent (EL) means which emits a light in response to a charge applied from the storage capacitor, and means for controlling the charge and discharge of the storage capacitor to drive the electroluminescent means with an AC pulse drive signal, the AC pulse drive signal being produced by repeating alternate connection of positive and negative terminals of the storage capacitor to the electroluminescent means each time after charging the storage capacitor.

DESCRIPTION OF THE PREFERRED EMBODIMENT

An embodiment of the present invention will be described below with reference to FIGS. 5 and 6.

Figure 5:
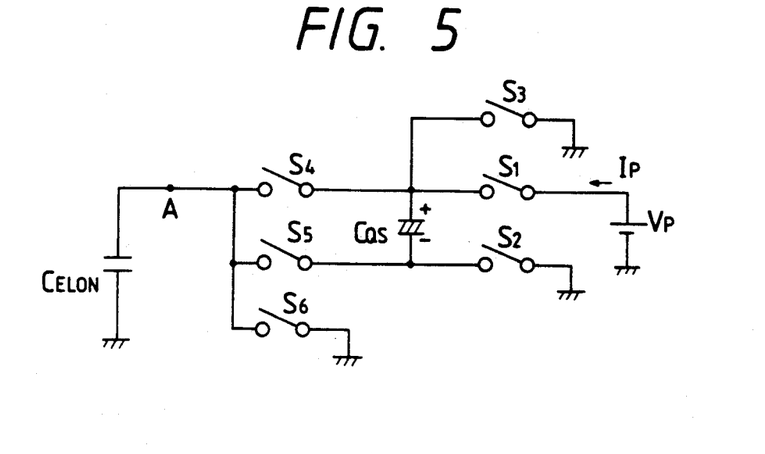
FIG. 5 is a circuit diagram showing an embodiment of a thin film EL device drive circuit according to the present invention.

FIG. 5 is a circuit diagram showing an embodiment of a thin film EL device drive circuit according to the present invention.

In FIG. 5, a reference character $C_{ELON}$ designates a capacitor large having a capacity enough to cause all of electroluminescent EL elements to emit light and the thin film EL device drive circuit is provided with a storage capacitor $C_{QS}$ having a at least as large as the total EL element capacity $C_{ELON}$. The positive terminal (+) of the storage capacitor $C_{QS}$ is connected to a high voltage DC power source Vp through a control switch S1, and the positive terminal is further grounded through a control switch S3. The positive terminal of the storage capacitor $C_{QS}$ is connected through a control switch S4 to a common terminal A of the EL elements. That is, the positive terminal (+) of the storage capacitor $C_{QS}$ is connected to the electrodes on one side of all EL elements.

More specifically, the total EL element capacity $C_{ELON}$ represents a total capacity when a plurality of EL element drive circuits shown in FIG. 1 are connected to form an EL device.

On the other hand, as shown in FIG. 5, the negative terminal (−) of the storage capacitor $C_{QS}$ is grounded through a control switch S2 and the negative terminal thereof is connected to the common electrode A of the EL elements through a control switch S5. In other words, the negative terminal of the storage capacitor $C_{QS}$ is connected to electrodes on one side of all EL elements through the control switch S5. The common terminal A of the EL devices is grounded through a control switch S6.

The total EL element capacity $C_{ELON}$ is determined according to the area of each EL element $C_{EL}$ and the number of pixels. As mentioned previously, the capacity of the storage capacitor $C_{QS}$ is at least as large as the total EL element capacity $C_{ELON}$. In this embodiment, such semiconductor switches as a MOS-FET and the like are used as the control switches S1 to S6.

The driving method of the thin film EL element drive circuit will be described with reference to the timing chart of FIG. 6. The control switches S1 to S6 are selectively subjected to a switching operation at the timing as shown in FIG. 6. The switching operation is carried out based on a positive logic and thus a high level indicates the closed state of the control switches and a low level indicates the open state thereof.

A period t1 is a charging period for charging the storage capacitor $C_{QS}$ initially, during which the control switches S1 and S2 are closed so that the storage capacitor $C_{QS}$ is charged by the DC power source Vp through the control switch S1. Meanwhile, the charge of the total EL element capacity $C_{ELON}$ is discharged by closing the control switch S6.

A period t2 is a positive polarity drive period during which the positive terminal of the storage capacitor $C_{QS}$ is connected the common terminal A by turning-off the control switches S1 and S6 and closing the control switch S4, so that the charge accumulated in the storage capacitor $C_{QS}$ is transferred to the total EL element capacity $C_{ELON}$ to thereby cause the EL elements to emit a light.

A period t3 is a charging period for charging the storage capacitor $C_{QS}$ during which the control switch S4 is turned-off to suspend the supply of the charge to the total EL element capacity $C_{ELON}$ and the control switch S1 is closed so that the DC power source Vp charges the capacitor $C_{QS}$ by the amount of charge transferred to the total EL element capacity $C_{ELON}$. Meanwhile, the charge of the total EL element capacity $C_{ELON}$ is discharged by closing the control switch S6.

A period t4 is a negative polarity drive period during which the positive terminal of the storage capacitor $C_{QS}$ is grounded by closing the control switch S3 and the negative terminal of the storage capacitor $C_{QS}$ is connected to the common terminal A by closing the control switch S5 to transfer the charge to the total EL element capacity $C_{ELON}$. As a result, the EL elements are subjected to negative polarity drive to cause the EL devices to emit a light.

A period t5 which is similar to the period t3, is a charging period during which the control switches S1, S2 and S6 are closed to charge the storage capacitor $C_{QS}$ and to discharge from the total EL element capacity $C_{ELON}$.

When the EL devices are not emitting a light, the OFF resistance of the load capacity of all EL elements is extremely large and thus the EL elements can be deemed an open switch. Accordingly, the maximum value of the total EL element load capacity is made equivalent to the total capacity when all EL elements are emitting light and this capacity is regarded as the total EL element capacity $C_{ELON}$.

Figure 6:
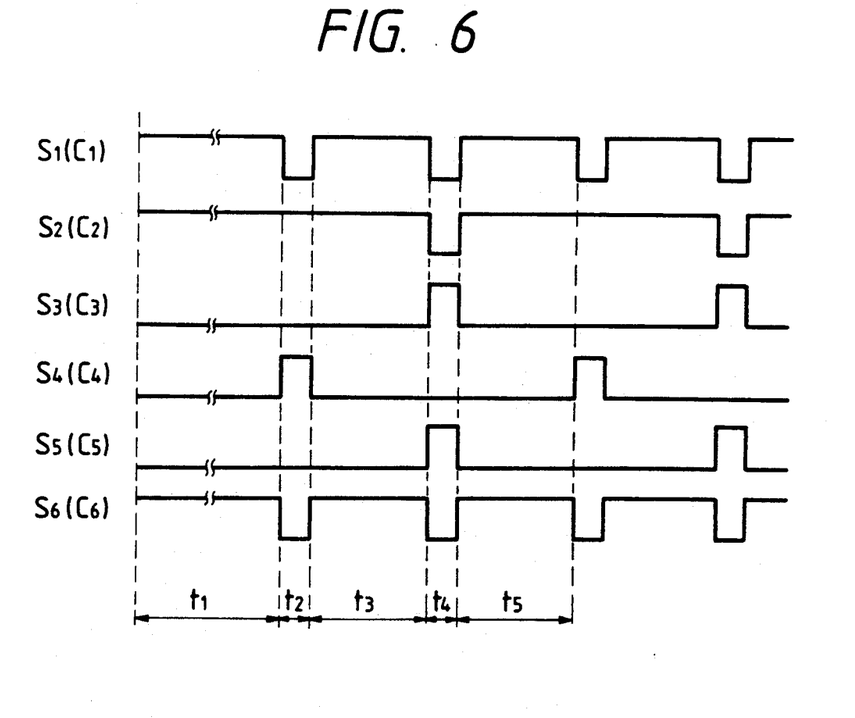
FIG. 6 is a timing chart for explaining a method for driving an EL device with the thin film EL device drive circuit of FIG. 5.

The cycle of electroluminescence in the EL drive is expressed by the period of t2+t3 (=t4+t5) in FIG. 6. This cycle can be set as required at a frame frequency or over, regardless of the frame frequency for the display.

In this embodiment, the frame frequency is set at 60 Hz for instance and the frequency of the drive circuit is set to 180 Hz or over about three times the frame frequency.

In the period t2 during which the positive charge is transferred from the storage capacitor $C_{QS}$ to the total EL element capacity $C_{ELON}$, the initial charge of the total EL element capacity $C_{ELON}$ is ZERO and the initial charge of the storage capacitor $C_{QS}$ is expressed by ($C_{QS} \times Vp$) where $C_{QS}$ represents the capacity of the storage capacitor and Vp represents the output voltage of the DC power source. Therefore, after the control switch S4 is turned on, the variation $\Delta$ Vp in potential appearing across the storage capacitor $C_{QS}$ is expressed by the following equation (1):

$$\Delta Vp = \{C_{ELON}/(C_{ELON}+C_{QS})\} \times Vp \qquad (1)$$

A voltage $V_{EL}$ necessary for the EL display is determined such that the potential variation $\Delta$ Vp and the voltage Vp of the DC power satisfy the relationship with regard to a threshold voltage $V_{TEL}$ of the EL element and a display modulation voltage $V_{MOD}$ and the voltage $V_{EL}$ is expressed by the following equation (2):

$$V_{EL} = VP - \Delta Vp \geq V_{TEL} + V_{MOD} \qquad (2)$$

Accordingly, the set value of the DC power source Vp is determined so as to the minimum display luminance when all EL elements emit a light.

In charging of the storage capacitor $C_{QS}$ during the period t3, a current value Ip supplied from the power source Vp is expressed by the equation (3) as follows:

$$IP = \Delta Vp \times C_{QS}/t3 \qquad (3)$$

Also in case of the negative polarity drive, the periods t4 and t5 can be similarly considered as the periods t2 and t3.

In addition, the initial charging period t1 for the storage capacitor $C_{QS}$ can be available as the charging period of the supply current value Ip since a high speed response is not required in actual use. The period t1 is expressed by the equation (4) as follows:

$$t1 = Vp \times C_{QS}/Ip \qquad (4)$$

In this case, calculation with practical values can be carried out as an attempt.

In case of the total EL element capacity $C_{ELON}=1$ $\mu F$, the storage capacity $C_{QS}=10$ $\mu F$, the DC power source voltage Vp=200 V, the period t2=the period t4=40 $\mu s$ and the period t3=the period t5=960 $\mu s$ (t2+t3=1 ms, 1 KHz drive), the variation in potential $\Delta$ Vp and the supply current value Ip are as follows:

$$\Delta Vp = \{1 \ \mu F/(1 \ \mu F + 10 \ \mu F)\} \times 200 \ V = 18 \ V$$

$$Ip = 18 \ V \times 10 \ \mu F/960 \ \mu s = 0.19 \ A$$

Power consumption Pp is 5.7 W.

In contrast, with the conventional thin film EL device drive circuit, a current Ia and a power consumption Pa in case of the sine wave drive are as given below:

$$Ia = Vp \cdot \omega \ C_{ELON} \cdot \sin(\omega t + \pi/2) \ \therefore Ia = 200$$
$$V \cdot 2\pi \times 1000/2 \cdot 1 \ \mu F = 0.63 \ A \ peak$$

Power consumption Pa is 40 W.

With the conventional EL drive circuit in which a pulse signal is directly generated by a pulse signal generator, the current value Ia is required below the following value in order to carry out the charge transfer within the period t2=40 $\mu s$.

$$Ia = Vp \cdot C_{ELON}/t2 \ \therefore Ia = 200 \ V \cdot 1 \ \mu F/40 \ \mu s = 5 \ A$$

Specifically, as known from comparison of the supply current Ip=0.19 A in this embodiment and the sine wave current Ia=0.63 A in the conventional embodiment and current Ia=5 A in use of the conventional pulse generator, the thin film EL device drive circuit in accordance with this embodiment can be made to have a low supply current capacity, and the power consumption Pp=5.7 W in this embodiment can be considered substantially reduced as compared with the power consumption Pa=40 W in the conventional sine wave drive.

The initial charging period t1 of the storage capacitor $C_{QS}$ in the equation (4) is as shown below in comparison with Ip=0.19 A.

$$t1 = 200 \ V \times 10 \ \mu F/0.19 \ A = 10.5 \ ms$$

For the EL display apparatus, the initial charging time t1=10.5 ms is within an allowable range as a time from turning on of the power supply till the start of the display.

In the application to the EL printer head, the total EL element capacity $C_{ELON}$ (load capacity) is relatively small because the number of pixels is less than for the EL display apparatus. But the area per pixel is larger and higher luminance characteristic is required and therefore the drive frequency has to be adjusted.

Accordingly, appropriate adjustments using the equations (1) to (4) in accordance with the total EL element capacity $C_{ELON}$ and the period t1 to t5 will allow optimal adaptation to the EL printer head.

Such a thin film EL device drive circuit as described hereinbefore allows for an AC pulse drive using a high voltage DC power source Vp capable of supplying a high voltage drive signal to a common terminal A of EL elements contained in an EL device. In the drive circuit, a storage capacitor $C_{QS}$ is charged by the power source Vp and the positive and negative charges of the capacitor $C_{QS}$ are alternately transferred to the EL elements by repeating such operations as charging the storage capacitor $C_{QS}$ using the DC high voltage source Vp, controlling the charge of the storage capacitor $C_{QS}$ with a plurality of control switches, connecting the positive terminal of the storage capacitor $C_{QS}$ to the common terminal A of the EL elements, charging again the storage capacitor $C_{QS}$ and connecting the negative terminal of the storage capacitor to the common terminal A. This results in a high luminance drive, a extremely low supply current capacity of a drive signal source and lowing power consumption of the drive signal source, when compared with the conventional sine wave drive or the direct pulse drive. Further, it becomes possible to minimize the size of the drive signal source.

Figure 7:
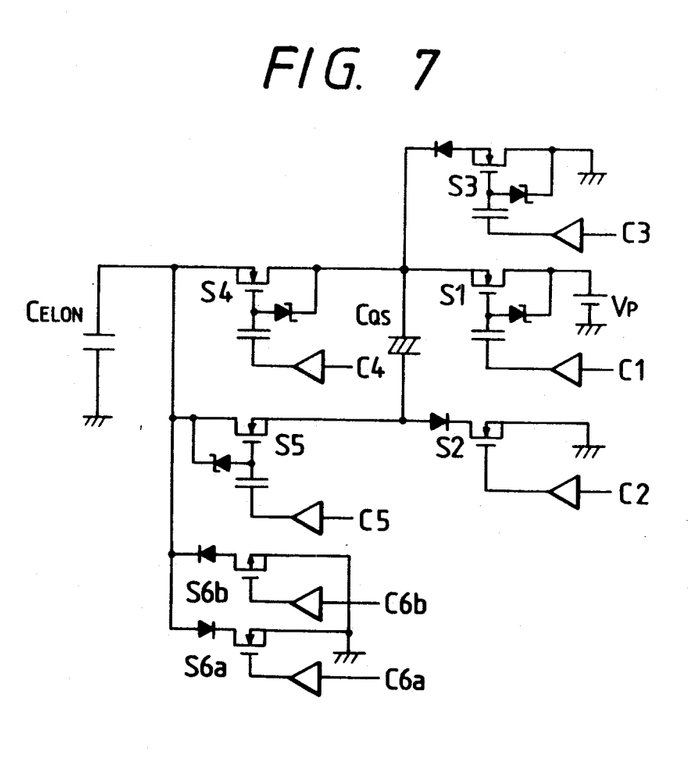
FIGS. 7 and 8(a) are circuit diagrams each showing a concrete example of the thin film EL device drive circuit shown in FIG. 5.
Figure 8A:
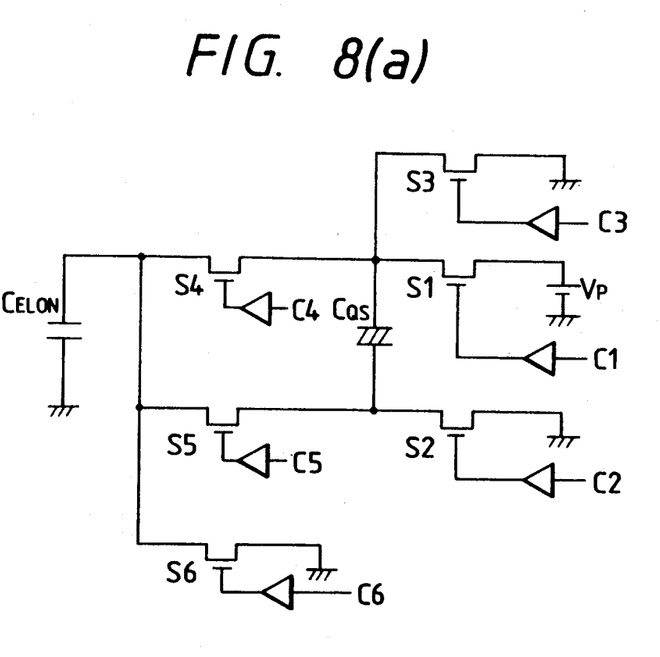
Figure 8B:
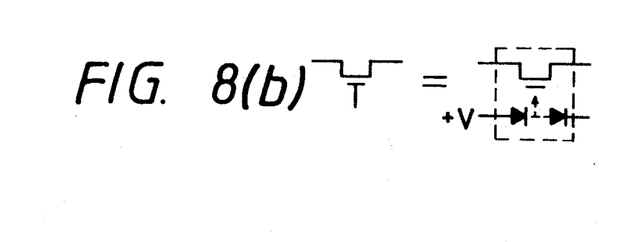
FIG. 8(b) is a circuit diagram showing an equivalent circuit of a photo-coupling semiconductor relay which is used as control switches S1 to S6 in FIG. 8(a)

FIGS. 7 and 8(a) are circuit diagrams each showing a concrete example of the thin film EL device drive circuit shown in FIG. 5. In FIG. 7, P-ch and N-ch MOS FETs are used as the control switches S1 to S6 to meet with requirement for high speed drive. On the other hand, in case of an drive frequency Va being less than 100 Hz, that is, in case of low speed drive, a photo-coupling semiconductor relay may be replaced for the P-ch and N-ch MOS FETs, and a concrete example of the circuit employing such a photo-coupling semiconductor relay is shown in FIG. 8(a). FIG. 8(b) is also a circuit diagram showing an equivalent circuit of the photo-coupling semiconductor relay.

Figure 9:
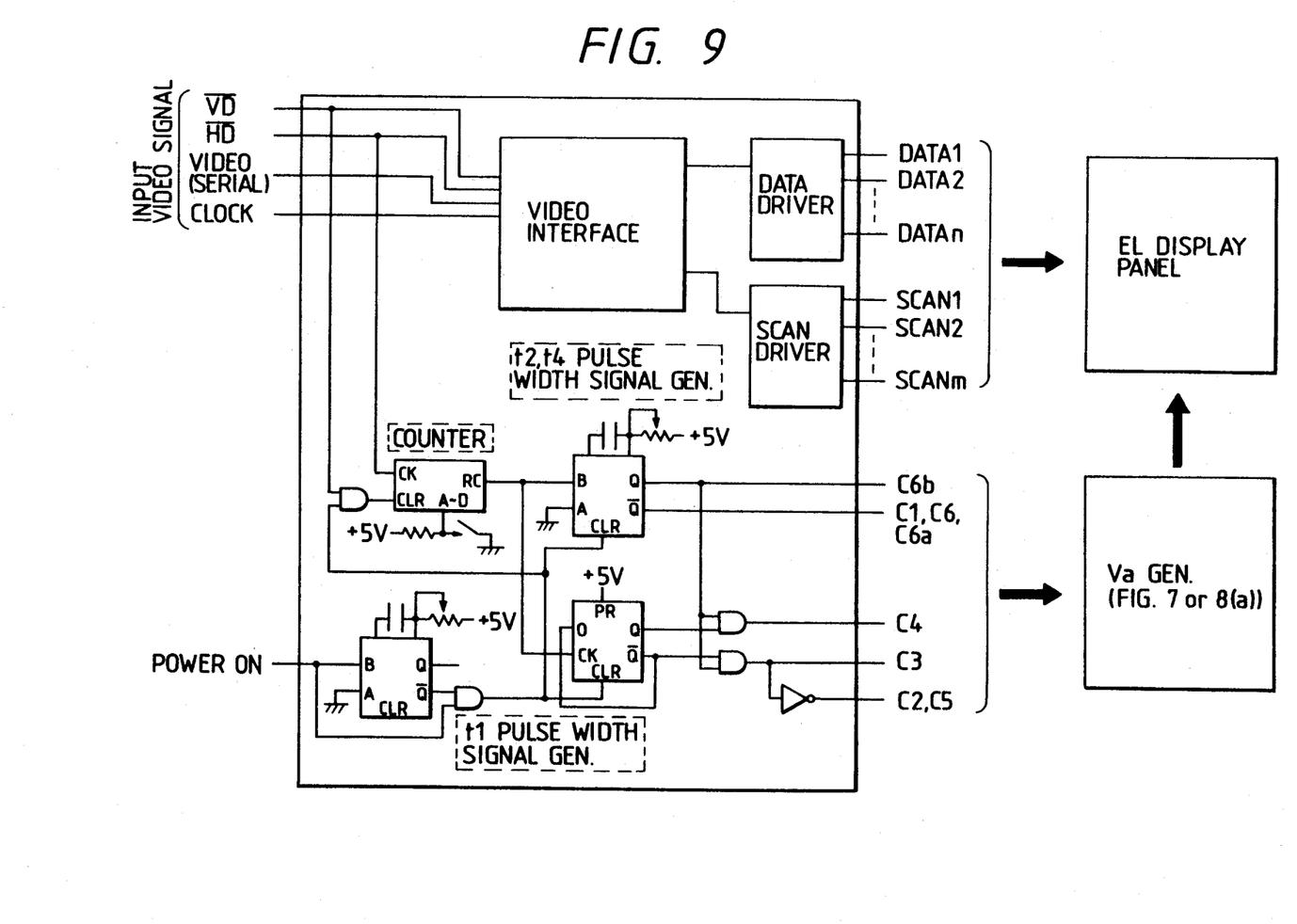
FIG. 9 is a circuit diagram showing a detailed circuit for generating control signals C1 to C6 applied to the circuit shown in FIGS. 7 and 8.

FIG. 9 is a circuit diagram showing a detailed circuit for generating control signals C1 to C6 applied to the circuit shown in FIGS. 7 and 8.

In the circuit shown in FIG. 9, upon the application of a power, a pulse signal representing t1 pulse width is first generated, and then the control signals C1 to C6 are generated. The frequency of the EL drive signal Va is obtained by subjecting a horizontal synchronization signal HD to frequency division in a counter and pulse signals representing t2 and t4 pulse widths are generated using a one-shot multivibrator. Thereafter, these signals are processed in the following logic circuit to produce the control signals C1 to C6, the waveform of which is shown in FIG. 6.

In summary, since the present invention allows to apply an AC pulse signal to EL elements contained in an EL device to thereby perform high luminance drive of the EL device and realize AC pulse drive, it is possible to reduce the supply current capacity and power consumption.

What is claimed is:

1. A thin film electroluminescent device drive circuit comprising:
   an electroluminescent means for emitting light in response to an applied charge, said electroluminescent means having first and second terminals, said first terminal being connected to a predetermined constant voltage;
   a storage capacitor, having a position terminal and a negative terminal, for accumulating a charge to supply to said electroluminescent means to provide high power to said electroluminescent means;
   a DC power source for charging said storage capacitor; and
   means for controlling the charge and discharge of said storage capacitor so as to drive said electroluminescent means with an AC pulse drive signal, said AC pulse drive signal being produced by repeating alternate connection of the positive terminal and the negative terminal of said storage capacitor to said electroluminescent means after each time said storage capacitor is charged.

2. A thin film electroluminescent device drive circuit comprising:
   an electroluminescent means for emitting light in response to an applied charge, said electroluminescent means having first and second terminals, said first terminal being connected to a ground;
   a storage capacitor, having a positive terminal and a negative terminal, for accumulating a charge to supply to said electroluminescent means to provide high power to said electroluminescent means;
   a DC power source for charging said storage capacitor; and
   means for controlling the charge and discharge of said storage capacitor so as to drive said electroluminescent means with an AC pulse drive signal, said AC pulse drive signal being produced by repeating alternate connection of the positive terminal and the negative terminal of said storage capacitor to said electroluminescent means after each time said storage capacitor is charged.

3. The thin film electroluminescent device drive circuit as defined in claim 2 wherein said control switches are thin film transistors.

4. A thin film electroluminescent device drive circuit comprising:
   a DC power source;
   a storage capacitor having a positive and a negative terminal, said storage capacitor being charged by said DC power source;
   an electroluminescent means having first and second terminals, for emitting light in response to an applied charge, said first terminal being connected to a ground;
   a first control switch for connecting said DC power source and the positive terminal of said storage capacitor;
   a second control switch for connecting the negative terminal of said storage capacitor to a ground;
   a third control switch for connecting the positive terminal of said storage capacitor to a ground;
   a fourth control switch for connecting the positive terminal of said storage capacitor to said second terminal of said electroluminescent means;
   a fifth control switch for connecting the negative terminal of said storage capacitor to said second terminal of said electroluminescent means;
   a sixth control switch for connecting said second terminal of said electroluminescent means to a ground; and
   means for controlling the charge and discharge of said storage capacitor so as to drive said electroluminescent means with an AC pulse drive signal by:
      turning-off said third, fourth and fifth control switches and turning-on said first, second and sixth switches to charge said storage capacitor and to reset said electroluminescent means;
      turning-off said first and sixth control switches and turning-on said fourth control switch to supply a positive charge of said storage capacitor to said electroluminescent means to perform a positive polarity drive;

turning-off said fourth control switch and turning-on said first and sixth control switches to discharge said electroluminescent means and to charge said storage capacitor with said DC power source, turning-off said sixth, first and second control switches and turning-on said fifth and third control switches to supply a negative charge of said storage capacitor to perform a negative polarity drive, and turning-off said fifth and third control switches and turning on said sixth, first and second control switches to discharge said electroluminescent means and to charge said storage capacitor with said DC power source.

5. A thin film EL device drive circuit as defined in claim 1 wherein a capacity of said storage capacitor is larger than a load capacity of said electroluminescent means.

* * * * *